United States Patent [19]

Scott

[11] Patent Number: 5,540,747
[45] Date of Patent: Jul. 30, 1996

[54] MULTIPLE ORIFICE GLASS FEED UTILIZING PLUNGERS

[75] Inventor: Garrett L. Scott, Toledo, Ohio

[73] Assignee: Owens-Brockway Glass Container Inc., Toledo, Ohio

[21] Appl. No.: 307,542

[22] Filed: Sep. 16, 1994

Related U.S. Application Data

[63] Continuation of Ser. No. 48,636, Apr. 19, 1993, abandoned.

[51] Int. Cl.$^6$ .................................................. C03B 7/086
[52] U.S. Cl. .................................. 65/328; 65/330; 65/362
[58] Field of Search .............................. 65/221, 324, 325, 65/328, 330, 331, 362; 24/135 A, 135 R, 136 B

[56] References Cited

U.S. PATENT DOCUMENTS

| | | |
|---|---|---|
| 1,529,948 | 3/1925 | Freese . |
| 1,631,061 | 5/1927 | Rankin ........................................ 65/331 |
| 1,675,819 | 7/1928 | Peiler ........................................ 65/330 |
| 1,792,932 | 2/1931 | Rule . |
| 1,798,217 | 3/1931 | Noble ........................................ 65/221 |
| 1,926,764 | 9/1933 | Dorman . |
| 2,003,058 | 5/1935 | Stenhouse . |
| 3,248,204 | 4/1966 | Tyner ........................................ 65/362 |
| 3,582,309 | 6/1971 | Bracken ..................................... 65/328 |
| 3,711,266 | 1/1973 | Daly . |
| 4,478,631 | 10/1984 | Mumford . |
| 4,554,000 | 11/1985 | Suomala et al. . |
| 4,581,054 | 4/1986 | Mumford . |
| 4,793,849 | 12/1988 | Bratton . |

*Primary Examiner*—Donald E. Czaja
*Assistant Examiner*—Steven P. Griffin

[57] ABSTRACT

A multiple glass feed system for use with a glass forehearth including a plurality of closely spaced plungers, each of which is individually adjusted independently of the other. The upper end of each plunger is oval in cross section and the lower end is round. The oval portions of the plungers are provided in side by side relation with the long axis of each oval portion parallel to the long axis of the adjacent plungers.

3 Claims, 4 Drawing Sheets

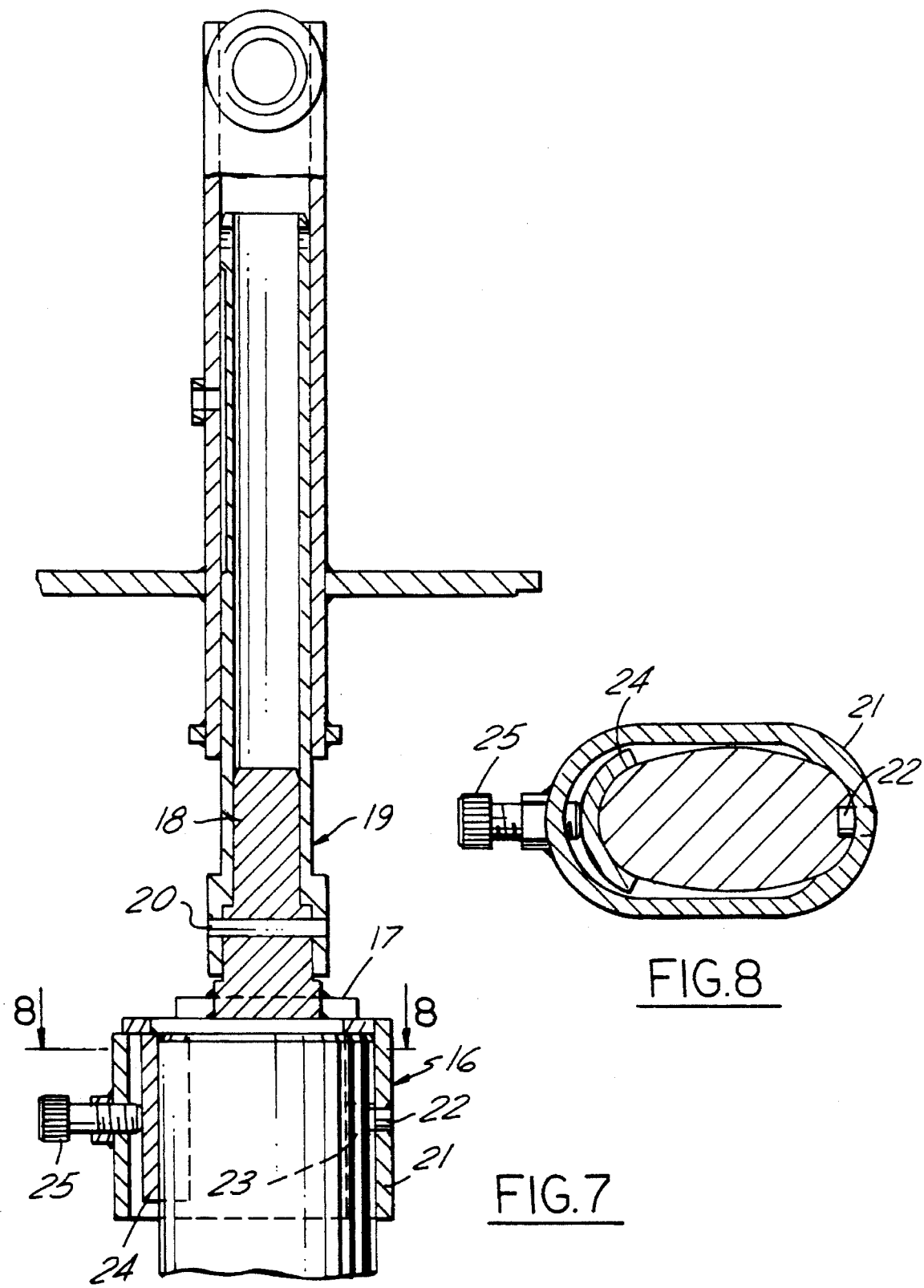

MULTIPLE ORIFICE GLASS FEED UTILIZING PLUNGERS

This is a continuation of application Ser. No. 08/048,636 filed on Apr. 19, 1993, now abandoned.

This invention relates to multiple orifice feed systems for producing qlass gobs.

BACKGROUND AND SUMMARY OF THE INVENTION

In the manufacture of glass articles, it is common to provide a glass forehearth and multiple orifices which are controlled by reciprocable needles or plungers in order to provide the necessary uniform weight of gobs. Plural needles and orifices are utilized in order to maximize glass production.

Typical systems are shown in U.S. Pat. Nos. 1,529,948, 1,792,932, 1,926,764, 3,711,266, 4,478,631, 4,554,000, 4,581,054 and 4,793,849.

In such systems, the plungers are conventionally round in cross section. When the plungers are long, on the order of 30" to 48" long, with diameters about 2 to 2½" the strength of the plungers may not be adequate.

Among the objectives of the present invention are to provide a multiple orifice feed system wherein the plungers are configured such that they have greater strength and durability; wherein the increased strength is achieved without affecting the placement of the plungers; and wherein the plungers can be positioned in closely spaced relationship as desired.

In accordance with the invention, a multiple glass feed system is provided for use with a glass forehearth including a plurality of closely spaced plungers, each of which is individually adjustable relative to the other. The upper end of each plunger is oval in cross section and the lower end is round. The oval portions of the plungers are provided in side by side relation with the long axis of each oval portion being parallel to the long axis of the adjacent plungers.

DESCRIPTION OF THE DRAWINGS

FIG. 7 is a fragmentary sectional view of a plunger taken along the vertical line 7—7 in FIG. 6.

FIG. 8 is a sectional view taken along the line 8—8 in FIG. 7.

DESCRIPTION

Figure 1:
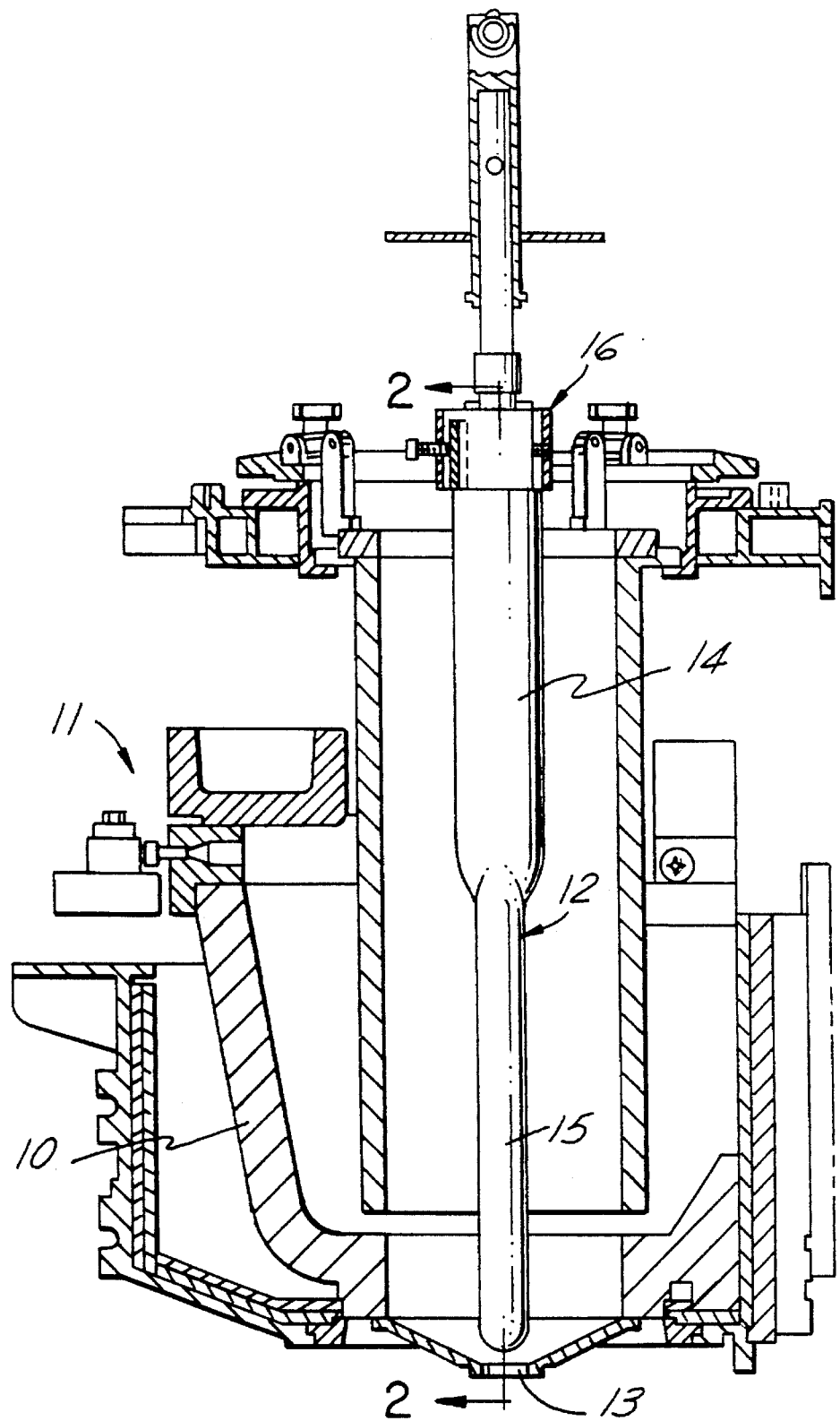
FIG. 1 is a part sectional elevational view of a multiple orifice feed system for producing glass gobs embodying the invention.
Figure 2:
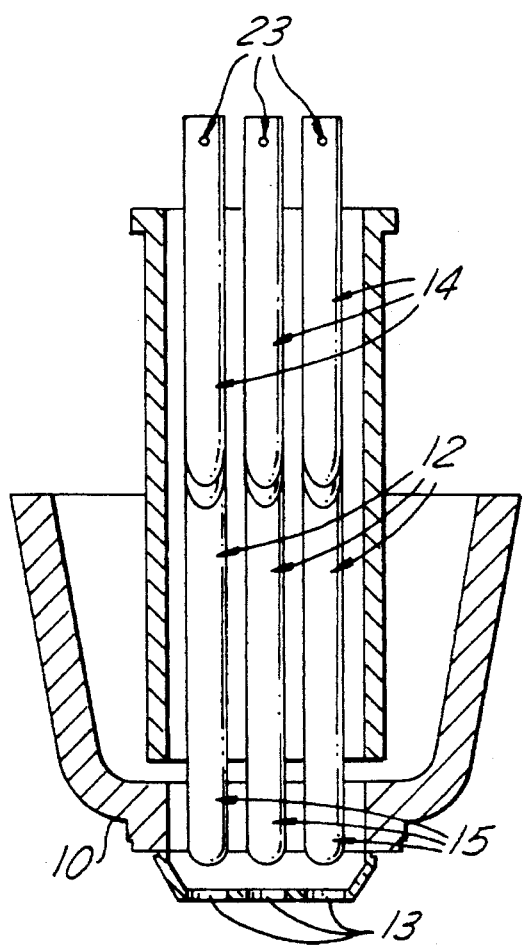
FIG. 2 is a vertical sectional view taken along the line 2—2 in FIG. 1.

Referring to FIG. 1, the multiple orifice glass feed system embodying the invention comprises a bowl 10 of a forehearth 11 and a plurality of vertical plungers 12 that function in connection with orifices 13. The plungers 12 are reciprocable to control the flow of glass out of the orifices 13 so that when associated shears, not shown, are used the size and weight of the gobs is consistent.

Figure 3:
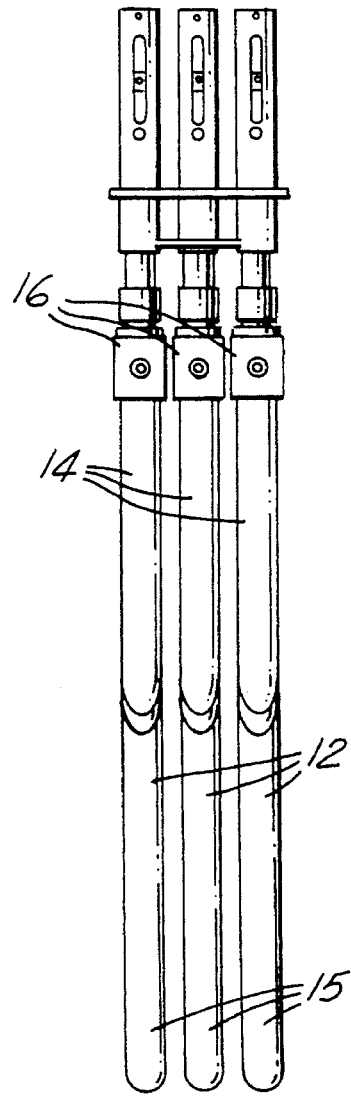
FIG. 3 is a side elevational view of the plungers, parts being broken away.
Figure 4:
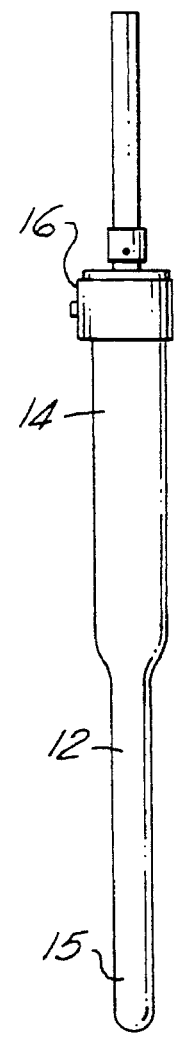
FIG. 4 is a front elevational view of a plunger shown in FIG. 1.
Figure 6:
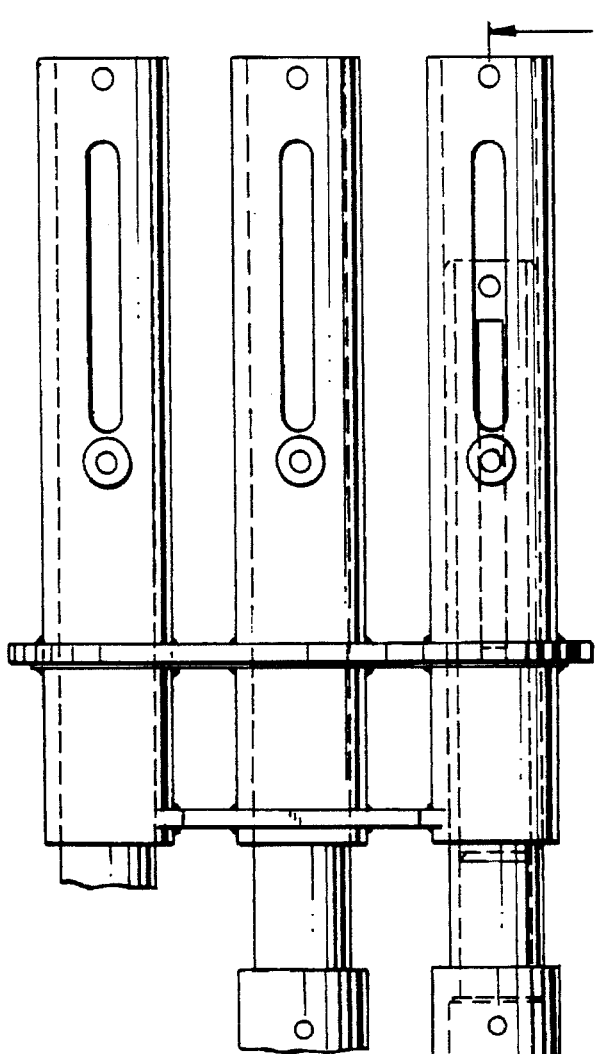
FIG. 6 is a fragmentary side view on an enlarged scale of a portion of the support mechanism for the plungers shown in FIG. 3.
Figure 5:
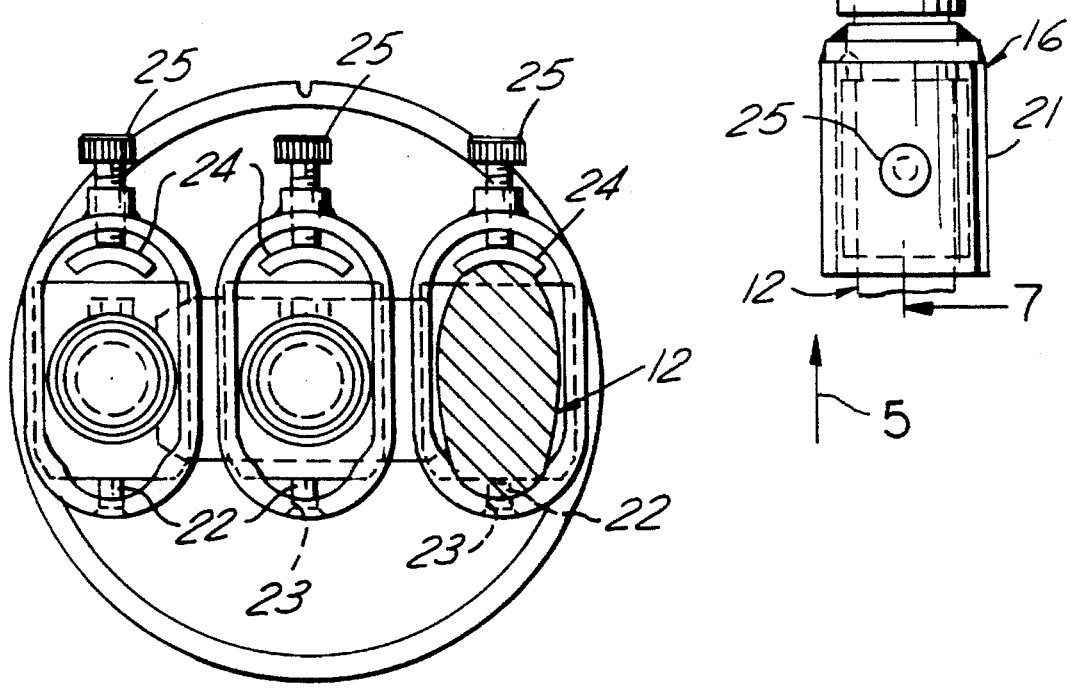
FIG. 5 is a fragmentary bottom view taken in the direction of the arrow 5 in FIG. 6, parts being broken away.

In accordance with the invention, each plunger 12 has an upper portion that is oval in horizontal cross section and a lower portion 15 that is cylindrical in horizontal cross section. Each upper oval portion has a long axis and a short axis. The plungers are supported by clamping mechanisms 16 in side by side relation with the long axis of the oval portion 14 lying in a plane with the planes of adjacent plungers 12 being parallel so that the plungers are in closely spaced relation (FIG. 3). As a result, the strength and durability of the plungers is substantially increased.

Referring to FIGS. 5–8, each clamping mechanism 16 comprises an upper plate 17 which has a connecting pin 18 fixed thereon and telescopically received in an actuator tube 19 and held therein by a pin 20. Each clamping mechanism 16 further comprises an oval chuck housing 21 which has a greater cross section than the oval portion 14 of the respective plunger 12. Chuck housing 21 includes a locating pin 22 in one end of the housing 21 having the smaller curvature. Pin 22 engages an opening 23 in the respective plunger 12. A liner piece 24 of small arcuate cross section corresponding to the other end of the oval portion 14 is pressed to clamp the plunger 12 by a cap screw 25 threaded in chuck housing 21.

It can thus be seen that there has been provided a multiple glass feed system for use with a glass forehearth including a plurality of closely spaced plungers, each of which is individually adjustable relative to the other. The upper end of each plunger is oval in cross section and the lower end is round. The upper end of each plunger has the same oval cross section. The lower end of each plunger has the same diameter. The oval portions of the plungers are provided in side by side relation with the long axis of each oval portion being parallel to the long axis of the adjacent plungers.

I claim:

1. A multiple orifice glass feed system for use with a glass forehearth including a plurality of closely spaced vertical plungers, each said vertical plunger having an upper portion and a lower portion, each said upper portion of each vertical plunger having an upper end, each said upper portion of each vertical plunger being oval in horizontal cross section with said oval horizontal cross section having a long axis and a short axis, each said lower portion of each vertical plunger being cylindrical in horizontal cross section, said long axis of each said oval horizontal cross section of each vertical plunger defining a plane, means for engaging the upper ends of said vertical plungers and supporting said vertical plungers in closely spaced side-by-side relationship with said planes of adjacent plungers being parallel, said means engaging and supporting said plungers being constructed and arranged to vertically adjust said plungers independently of one another, and said upper portion of each said vertical plunger having the same oval cross section, and said lower portion of each said vertical plunger having the same diameter.

2. The multiple glass orifice feed system set forth in claim 1 wherein said means engaging and supporting said plungers comprises a clamping mechanism individual to each said plunger.

3. The multiple glass orifice feed system set forth in claim 2 wherein each said clamping mechanism comprises an oval chuck housing individual to each said plunger into which the upper end of said plunger extends, a curved liner plate interposed within said housing and means extending between said housing and said liner plate to cause said plate to engage said plunger and clamp said plunger in said housing.

* * * * *